United States Patent [19]

Deeg et al.

[11] Patent Number: 4,755,336
[45] Date of Patent: Jul. 5, 1988

[54] PROCESS FOR MAKING POLYESTER BLEND FIBER

[75] Inventors: Martin H. G. Deeg, Maplewood, N.J.; Norman J. Bond, Matthews, N.C.

[73] Assignee: Hoechst Celanese Corporation, Somerville, N.J.

[21] Appl. No.: 862,944

[22] Filed: May 14, 1986

[51] Int. Cl.⁴ .............................. D01F 5/12; D01F 6/92
[52] U.S. Cl. ..................................... 264/103; 264/168; 264/210.4; 264/210.5; 264/210.8; 264/211.15; 264/211.17; 264/234; 264/237; 264/345; 264/348; 525/444
[58] Field of Search .................... 264/103, 210.8, 345, 264/168, 210.2, 210.4, 210.5, 211.15, 211.17, 234, 237, 348; 428/395; 525/444

[56] References Cited

U.S. PATENT DOCUMENTS

| | | | |
|---|---|---|---|
| 3,681,188 | 8/1972 | Harris | 428/395 |
| 3,822,334 | 7/1974 | Patterson | 264/210.8 |
| 4,159,617 | 7/1979 | Allan | 264/345 |

Primary Examiner—Jan H. Silbaugh
Assistant Examiner—Hubert C. Lorin
Attorney, Agent, or Firm—Marvin Turken

[57] ABSTRACT

A process is provided wherein a polymer blend of a poly(butylene terephthalate) and about 5 to 25% by weight of poly(ethylene terephthalate) is melt spun to form a fiber or yarn which is then drawn at an elevated temperature resulting in the poly(butylene terephthalate) having a stable beta crystal form in relaxed condition. The fiber or yarn may then be subjected to a heat relaxation treatment which changes the crystal form of the poly(butylene terephthalate) from the beta to the alpha form resulting in some shrinkage of the fiber or yarn and causing it to have a greater degree of stretchability.

7 Claims, No Drawings

PROCESS FOR MAKING POLYESTER BLEND FIBER

This invention relates to fibers comprising polybutylene terephthalate (PBT) having improved properties and processes of producing such fibers and utilizing them in various end products.

BACKGROUND OF THE INVENTION

Polyesters derived from terephthalic acid or its derivatives are known to possess a spectrum of properties which make them suitable for a multiplicity of fiber applications. The polymer in this category which has found the widest commercial application is polyethylene terephthalate (PET) which has in general excellent mechanical and other properties important in the use of fibers and which can be easily melt spun into a variety of useful fiber products. However, despite the general utility of PET in fiber applications, there exist uses for which somewhat different properties are required than are possessed by PET fibers, e.g. a higher than usual degree of resilience or stretchability as required for example, for certain types of stretch fabrics, pile carpet or fiberfill. For these applications, it has been found that polytetramethylene terephthalate, sometimes referred to as polybutylene terephthalate (PBT) may better serve the purpose than PET.

Connected to these differences in properties between PET and PBT is an inherent characteristic of fiber forming PBT polymers not possessed by PET. Thus, melt spun fibers of PBT have been found to have two crystal forms which have been designated as "alpha" and "beta." Moreover, PBT fiber undergoes a reversible stress induced crystal transition between these forms, the beta form being obtained when a sufficiently high stress is applied externally to the fiber and returning to the alpha form upon removal of the load. This crystal transition occurs fairly sharply at a strain of about 4 to 12% resulting in a plateau in the stress-strain curve of the fiber in this area. It has been found that the beta crystal form prevalent when the externally applied stress exceeds the latter strain range is more elongated than the alpha form. Moreover, release of the stress and transition of the PBT to the alpha form causes some reduction in fiber length due to this transition independent of the normal reduction resulting from the elimination of crystal deformation associated with a normal, linear stress-strain curve. The crystal transition under stress occurs more readily in both directions at elevated temperatures near or above the glass transition temperature of the polymer, than at lower temperatures.

The phenomenon of crystal transition in PBT fibers is variously documented in the literature including the following articles: I. H. Hall et al, "Chain Conformation of Poly(tetramethylene terephthalate) and its Change with Strain" published in *Polymer*, 1976, Vol. 17, 807–815; and K. Tashiro et al, "Solid-State Transition of Poly(butylene terephthalate) Induced by Mechanical Deformation," published in *Macromolecules*, 1980, Vol. 13, 137–145.

While PBT fibers produced by known methods are often satisfactory in applications requiring a relatively high degree of stretchability and resilience, there are nevertheless limitations to its production and properties under certain circumstances which it would be desirable to overcome and these limitations are related to the property of crystal transition under stress described previously. Thus, there is a limitation to the spinning speed, i.e. initial wind-up speed of PBT using yarn tensions normally utilized for this polymer, since the frictional and air drag on the fiber at high speeds can cause the strain on the solidified but still hot fiber to exceed the critical stress for the alpha to beta transition resulting in the beta crystal form as it is wound on a bobbin. Subsequently, as the fiber cools, it tends to convert to the alpha form with its attendant shrinkage. This causes a substantially increased force on the bobbin which can become crushed if it is not sufficiently rigid. As a result of this phenomenon, the wind-up speeds employed in the melt spinning of PBT often does not exceed about 3000 meters/min. since conventional bobbins would tend to be crushed if higher speeds were employed.

Another limitation connected to the use of PBT is its degree of stretchability in end use products, particularly in crimped or textured form. While such degree of stretchability is considered adequate and even superior for many applications, there exist other applications for which an even greater degree of stretchability would be desirable.

SUMMARY OF THE INVENTION

In accordance with this invention, a fiber-forming PBT is blended with at least about 5% preferably at least about 10% and up to about 25% by weight of a fiber-forming PET, and the blend is melt spun to form filaments which are then drawn at an elevated temperature and rapidly quenched under tension to below the glass transition temperature of the PET. The resulting drawn filaments are found to have a stable beta crystal form which retains its stability in the absence of any externally applied stress. As a result of this property, the fibers can be wound up at higher than usual speeds without any danger of the bobbins being crushed, since there is no transition of the crystal structure of the polymer from the beta to the alpha form as the yarn cools with its concomitant shrinkage of the yarn and increase in force on the bobbins. Moreover, the yarn having a stable beta crystal form, either with or without prior crimping or texturing, can be knitted or woven into a fabric, and the fabric heated in a relaxed state above the glass transition temperature of the PET resulting in a transition of the yarn polymer crystal structure from the beta to the alpha with an accompanying shrinkage of the individual filaments. The fabric so treated is now found to have properties similar to PBT but with a greater degree of stretchability than the fabric before the heat treatment.

Alternatively, the yarn having the stable beta crystal form, either with or without prior crimping or texturing, can be heat relaxed before being knitted or woven into a fabric. The resulting heat treated yarn will have a degree of stretchability greater than that of yarn before the heat treatment and, in the case of yarns crimped or textured before the heat relaxation treatment, greater than that of a conventional crimped or textured PBT. Such heat relaxed yarn can subsequently be knitted or woven into fabrics which also have a greater degree of stretchability than fabrics prepared from more conventional PBT yarns.

DESCRIPTION OF SPECIFIC EMBODIMENTS

The fiber-forming PBT contemplated for this invention contains at least 85 weight percent of polymerized tetramethylene terephthalate units, i.e. it is prepared from a monomeric mixture comprising at least 85 weight percent of stoichiometric amounts of butanediol-1,4 and terephthalic acid or its derivative. The remainder of the polymer may be composed of any units derived from various substitute glycols, dicarboxylic acids, or hydroxycarboxylic acids, as are well known in the art, some of which are listed, for example, in U.S. Pat. Nos. 3,822,334 of Patterson and 4,159,617 of Allan, the entire disclosures of which are incorporated by reference. Similarly, the fiber-forming PET may be any polymer comprising at least about 85 weight percent of polymerized ethylene terephthalate units prepared from a monomeric mixture comprising at least 85 weight percent of stoichiometric amounts of ethylene glycol and terephthalic acid or its derivative, with the remainder any of known substitute glycols, dicarboxylic acids, or hydroxycarboxylic acids such as those listed in the cited Patterson or Allan patents. Many fiber-forming PBT's have an inherent viscosity (IV) in the range, for example of about 0.65 to 1.2 dl/g and the contemplated PET's often have an IV in the range, for example, of 0.50 to 0.80 dl/g.

In addition to the PBT and about 5 to 25% by weight of PET as previously defined, the polymer blend may contain minor amounts of other polymers for various purposes. Preferably, however, the fiber-forming polymers "consist essentially" of the PBT and PET, i.e. no other polymer is present which will change the basic and essential characteristics of the composition. Most preferably, the fiber-forming polymers consist of the PBT and PET.

The polymer blends for melt spinning may be prepared by any convenient method known by those skilled in the art. For example, the PBT chip and PET chip may be mixed, dried, extruded through a screw extruder and rechipped. The blend chip may be melt spun using conventional techniques, e.g. by passing the chip through a hopper into a heated screw extruder from which it is transported to a heated block or spinning chamber and through a filter pack and the holes of a spinneret. The extruded, molten filaments are quenched to below the glass transition temperature of the polymer components using a forced air stream. The resulting filaments are then collected into an "as spun" yarn which is taken up on wind-up rolls. The polymer blend may be spun at a temperature, for example of about 265° to 290° C. using a spinneret containing for example about 1 to 200 holes each about 0.005 to 0.030 in. in diameter at a wind-up speed, for example of about 1000 to 6000 meters/min. to obtain a yarn having the same number of filaments and a total denier of about 2 to 800. The yarn is then hot drawn, e.g. at a draw ratio of at least about 1.1 preferably about 1.1 to 2.0, more preferably about 1.3 to 1.9 under a tension for example of about 20 to 120 centinewtons (cN) over a hot plate or other heating means, e.g. a heated tube, at a temperature of about 130° to 220° C. preferably 130° to 210° C. The hot drawn yarn is then cooled to below the glass transition temperature of the PET, e.g. by quenching it in a forced draft of air or any other inert gas to which the yarn is inert at a temperature of about 5° to 30° C., preferably 10° to 25° C., for a period of about 1 to 60 seconds to obtain an oriented yarn containing PBT segments in the stable beta crystal form. In some cases, particularly when the wind-up speed of the as spun yarn is over about 3000 meters/min., the frictional and air drag on the yarn while it is cooling is sufficient to orient the polymer and keep the PBT segments in beta form for a period sufficient to stabilize such beta crystal form even without any subsequent hot drawing step.

The stress-strain of the foregoing as drawn yarns of this invention do not exhibit any plateau in the 4 to 12% strain range and their X-ray diffraction patterns show that their PBT segments are in the beta crystal form even in the absence of any externally applied stress, apparently held in place by the frozen, amorphous PET segments. This is in marked contrast to substantially identically produced yarns of 100% PBT whose stress-strain curves show a plateau in the 4-12% range and whose X-ray diffraction pattern show the PBT to have the alpha crystal form in the relaxed state and the beta crystal form when an external stress causing a strain of 12% or over is applied.

If the as drawn yarns of this invention containing PBT segments in the beta crystal form are heat relaxed, i.e. heated at a temperature of about 120° to 180° C., preferably about 120° to 175° C., for a period of about 4 to 60 sec. in a relaxed form, their PBT segments then show the same alpha, beta crystal form transition pattern as yarns composed of 100% PBT. This is accompanied by some shrinkage of the filaments due to the alpha crystal form being less elongated than the beta form. The heat relaxed yarn wherein the PBT segments are in the alpha crystal form, have properties similar to that of identically produced yarns composed of 100% PBT.

Because of the stability of the beta form of the PBT segments of the yarns of this invention, such yarns either as drawn or in some cases as spun, can be wound up at relatively high windup speeds, e.g. over 3000 meters/min., without the woundup yarn exerting an unduly large force on the bobbin and possibly crushing it.

The yarn of this invention having PBT segments in stable beta form have a tenacity for example in the range of about 2 to 6, preferably about 2.5 to 4.5 grams/denier, an elongation of about 5 to 50, preferably about 10 to 50%, a modulus of about 10 to 120, preferably about 30 to 60 grams/denier and a denier per filament of about 1 to 10 preferably about 4 to 7. Such yarns either before or after crimping or texturing may be knitted or woven into fabrics or the fabric heat relaxed as previously described and the resulting fabric has greater stretchability than before heat relaxing and also greater stretchability than fabrics originally made from yarns, either crimped or textured, or flat, having PBT segments in the alpha form.

Crimping and texturing methods which are suitable for use in conjunction with this invention are stuffer box crimping, steam jet or other hot fluid crimping, gear crimping, knit-de-knit crimping, knife-edge crimping, false twist texturing and air jet texturing.

The following examples further illustrate the invention.

Examples 1, 2 and 3 and Comparative Examples A, B and C

These examples show the spinning conditions and properties of as spun precursor yarns produced in accordance with this invention (Examples 1, 2 and 3) and for comparison purposes yarns composed of 100% PBT (Comparative Examples A, B and C). In Examples 1, 2 and 3, chip composed of 100% PBT consisting entirely of polymerized tetramethylene terephthalate segments and having an 0.80 IV and chip composed of 100% PET consisting entirely of polymerized ethylene terephthalate segments and having an 0.65 IV were mixed in the indicated proportions, dried, extruded through a twin screw extruder and rechipped. In the case of Comparative Examples A, B and C only the PBT chip was so treated. The chip was melt spun into air at ambient temperature by conventional techniques using a screw extruder, heated spinning chamber and spinneret plate containing 33 holes arranged in five rows, each 0.013 in. in diameter and 0.018 in. in length. The resulting filaments were gathered into a yarn and taken up by a windup roll at the indicated windup speed.

The spinning conditions and properties of the resulting as spun yarn are summarized in Table 1 wherein "WUS" indicates windup speed in meters per minute.

tion. This plateau, however, was completely absent in all drawn fiber from polymer blends.

A heat relaxation treatment was carried out on selected samples to determine if the absence of the plateau in the stress/strain curves was a function of the drawing experiment. The samples were relaxed on the draw frame at 140° C. for 10 seconds and subsequently showed the characteristic plateau in the stress strain curve, indicating a recovery of the alpha/beta crystal transition. In addition to the changes in the stress strain curves, the elongation at break of the fiber is increased. In the case of fiber from a blend with 25% PET the

TABLE 1

| EXAMPLE | POLYMER % PET/% PBT | WUS m/min | SPIN TEMP C. | MODULUS g/den | TENACITY g/den | ELONGATION % |
|---|---|---|---|---|---|---|
| 1 | 25/75 | 3000 | 280 | 33.6 | 2.32 | 90. |
| 2 | 10/90 | 3000 | 275 | 29.8 | 2.53 | 96. |
| 3 | 10/90 | 4000 | 275 | 31.8 | 2.88 | 64. |
| A | —/100 | 3000 | 260 | 33.4 | 2.77 | 50. |
| B | —/100 | 4000 | 260 | 28.1 | 2.74 | 60. |
| C | —/100 | 5000 | 260 | 26.9 | 3.42 | 42. |

The results in Table 1 show that the physical properties of undrawn yarn spun from a polymer blend with up to 25% PET were similar to those of 100% PBT.

Examples 4 to 9 and Comparative Examples D to H

The spun fiber of Examples 1 to 3 and A to C was drawn to both constant denier (Examples 4, 5 and 6 and Comparative Examples D, E and I) and constant tension (Examples 7, 8 and 9 and Comparative Examples G and H). Drawing was done over a hot plate at 140°/150° C. for PBT and polymer blends were drawn at 140° C. The tension before (T1) and after and hot plate (T2) was monitored. A draw ratio of 1.4 was used for constant draw ratio experiments. During the constant tension experiments, T2, the tension between the hot plate and the draw roll was held constant at about 90 cn, and T1 was held at about 60 cn. The hot drawn fibers were quenched with a forced draft of air at 22° C. The primary drawing process variables and physical properties of the drawn fiber are given in Table 2.

elongation is increased from 26 to 47%.

To determine if a true conformational difference was present between drawn and heat relaxed samples, the wide angle X-ray diffraction pattern was determined. The diffraction patterns clearly showed that the PBT component is restrained in a different crystal structure in the as drawn state than after relaxation and that the PBT is in the beta form in the as drawn samples. The diffraction patterns further suggest that these fibers revert to the alpha form upon relaxation.

The orientations of the noncrystalline regions of both the PET and PBT component of the fiber increase during drawing. At the temperature used the tension is high enough for the crystal transition to occur resulting in a PBT component of the fiber in beta crystal form. As the fiber, still under stress, is removed from the hot plate and cools below the glass transition temperature of PET molecular mobility of the PET component decreases. The noncrystalline component of PET is retained and frozen in highly oriented form. When the PET concen-

TABLE 2

| EXAMPLE | POLYMER % PET/% PBT | WUS m/min | DENIER drawn | DRAW RATIO | T1/T2 cN | MODULUS g/den | TENACITY g/den | ELONGATION % |
|---|---|---|---|---|---|---|---|---|
| 4 | 25/75 | 3000 | 159 | 1.4 | 90/100 | 54.9 | 3.27 | 26. |
| 5 | 10/90 | 3000 | 162 | 1.4 | 110/135 | 45.4 | 3.31 | 27. |
| 6 | 10/90 | 4000 | 168 | 1.4 | 220/260 | 53.1 | 4.39 | 15. |
| D | —/100 | 3000 | 159 | 1.4 | 58/90 | 17.2 | 3.35 | 41. |
| E | —/100 | 4000 | 157 | 1.4 | 140/170 | 10.9 | 4.42 | 21. |
| F | —/100 | 5000 | 153 | 1.4 | 240/280 | 15.1 | 5.60 | 18. |
| 7 | 25/75 | 3000 | 175 | 1.3 | 60/95 | 45.6 | 2.78 | 33. |
| 8 | 10/90 | 3000 | 182 | 1.23 | 60/95 | 34.4 | 2.86 | 48. |
| 9 | 10/90 | 4000 | 212 | 1.1 | 60/90 | 33.3 | 3.14 | 46. |
| G | —/100 | 4000 | 180 | 1.2 | 60/86 | 17.0 | 3.48 | 39. |
| H | —/100 | 5000 | 188 | 1.1 | 60/90 | 15.0 | 3.87 | 37. |

The results of Table 2 indicate significant differences in the properties of as drawn fibers of 100% PBT and those containing up to 25% PET. Thus, the modulus of the as drawn 100% PBT fibers were in all cases substantially lower than identically produced as drawn blend fibers indicating that the blend fibers at this stage were considerably stiffer than the 100% PBT fibers. Moreover, the stress-strain curves of these samples were determined and the drawn (oriented), 100% PBT, fiber samples showed the characteristic plateau in the stress strain curve attributed to the alpha/beta crystal transitration in fiber spun from a PET/PBT blend is high enough, e.g. about 5% PET, a continuous PET phase exists along the fiber. Below the glass transition temperature of PET this continuous phase provides a rigid network through the fiber which does not permit the PBT phase to relax. Even after the stress is removed the PBT is retained in an extended crystal conformation. Upon reheating without tension that component of the oriented non-crystalline region with sufficiently high orientation will crystallize. Simultaneously, a relaxation and decrease in orientation will be observed in the less oriented noncrystalline segment. This relaxation allows the internal stress in the fiber to dissipate and permits a relaxation of the PBT component to the alpha crystal conformation. The result is a fiber which exhibits the stress strain characteristic of 100% PBT.

When the as drawn yarns of this invention, e.g. those produced in Examples 4 to 9 are knitted or woven into a fabric and the fabric is given a heat relaxation treatment, e.g. at a temperature of about 120° to 180° C. for a period of about 1 to 10 min., the heat relaxed fabric is found to have a greater degree of stretchability than it has before the heat relaxation treatment. A similar result is obtained with crimped or textured yarn wherein the crimping or texturing is carried out on the as drawn yarn before the heat relaxation treatment. Moreover a similar result is obtained whether the heat relaxation treatment is carried out on the fabric produced from the crimped or textured yarn or the crimped or textured yarn itself.

The fibers, yarns and fabrics of this invention are suitable for a wide variety of end use products including apparel, carpet, pile liners and fiberfill.

We claim:

1. A process comprising melt spinning a fiber-forming composition comprising a blend of a fiber forming poly(butylene terephthalate) containing at least 85 weight percent of polymerized tetramethylene terephthalate units in the polymer chain and about 5 to 25% by weight of a fiber-forming poly(ethylene terephthalate) containing at least 85 weight percent of polymerized ethylene terephthalate units in the polymer chain, to form an as spun fiber or yarn, drawing said as spun fiber or yarn at an elevated temperature to obtain a drawn fiber or strand with a beta crystal form, and cooling said drawn fiber or yarn to below the glass transition temperature of said poly(ethylene terephthalate) without transition of the crystal structure of the polymer from the beta to an alpha crystal form to thus obtain a yarn in which said poly(butylene terephthalate) is substantially in a stable beta crystal form in the absence of any externally applied stress.

2. The process of claim 1 wherein said poly(butylene terephthalate) consists solely of polymerized tetramethylene terephthalate units and said poly(ethylene terephthalate) consists solely of polymerized ethylene terephthalate units.

3. The process of claim 2 wherein the as spun fiber or yarn is initially wound up at a speed of about 1000 to 6000 meters/min., said drawing is carried at a draw ratio of about 1.1 to 2.0 and a temperature of about 130° to 220° C. and said cooling is carried out in a forced draft of an inert gas at a temperature of about 5° to 30° C. for a period of about 1 to 60 seconds.

4. The process of claim 1 wherein said fiber or yarn in which said poly(butylene terephthalate) is substantially in a stable beta crystal form in the absence of any externally applied stress, is subjected to a heat relaxation treatment to change the crystal form of the poly(butylene terephthalate) from the beta to the alpha form in the absence of any externally applied stress.

5. The process of claim 4 wherein said heat relaxation treatment is carried out at a temperature of about 120° to 180° C. for a period of about 4 to 60 seconds.

6. The process of claim 5 wherein said yarn is woven or knitted into a fabric prior to said heat relaxation treatment.

7. The process of claim 6 wherein said yarn is crimped or textured prior to being woven or knitted into a fabric.

* * * * *